Figure 1:
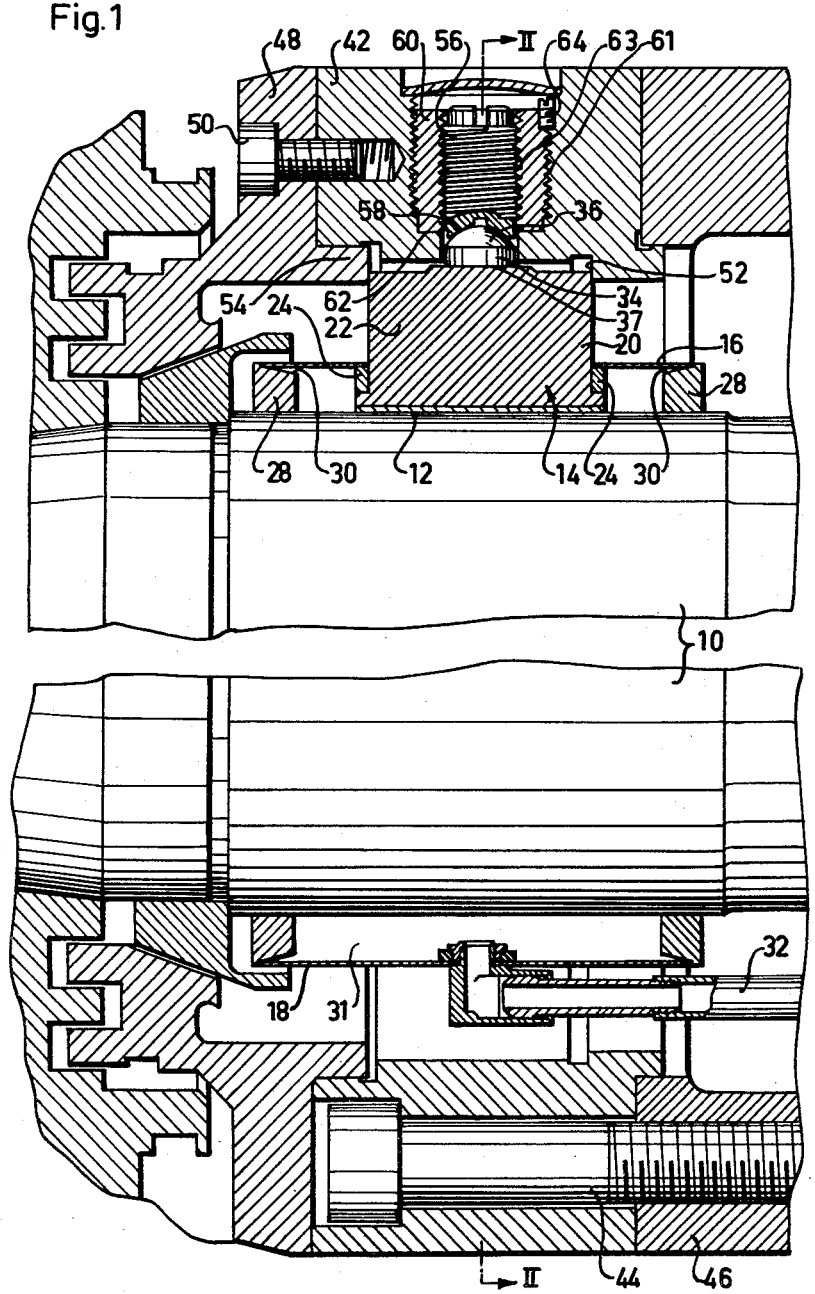

Sept. 11, 1962  A. G. F. WALLGREN  3,053,587
RADIAL BEARING OF THE SLIDING BLOCK TYPE
Filed July 8, 1959  2 Sheets-Sheet 1

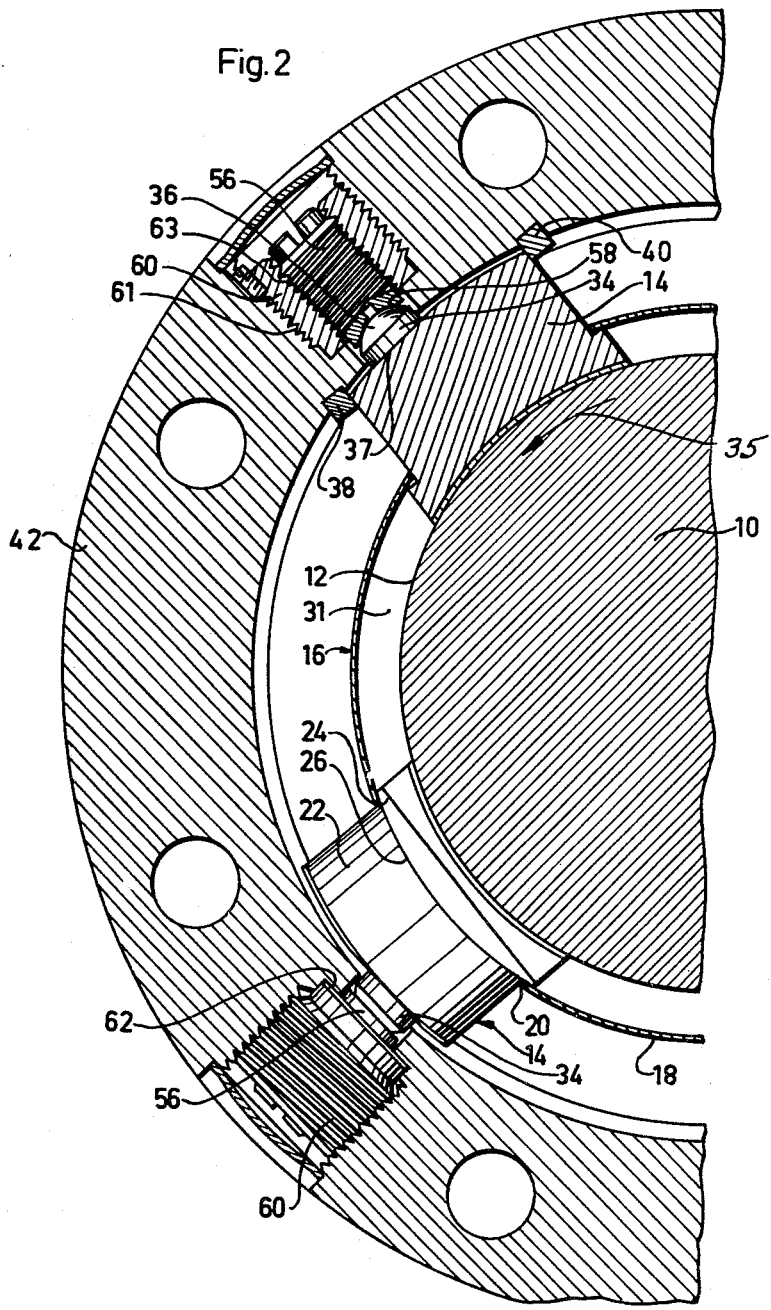

United States Patent Office 3,053,587
Patented Sept. 11, 1962

3,053,587
RADIAL BEARING OF THE SLIDING BLOCK TYPE
August Gunnar Ferdinand Wallgren, 33 Viktor
Rydbergsgatan, Goteborg, Sweden
Filed July 8, 1959, Ser. No. 825,693
7 Claims. (Cl. 308—73)

This invention relates to radial bearings of the sliding block type. More particularly this invention relates to radial bearings of the type provided with tiltable bearing blocks formed on the side facing the centre of the bearing with sliding surfaces adapted to cooperate with a sliding surface formed on a journal member so as to set up load-sustaining lubricant films, the tilting of the bearing blocks being effected about supporting surfaces of a bearing ring, a bearing housing or an equivalent member.

A bearing of the kind set forth is described in the specification of my Patent No. 2,758,892 issued August 14, 1956. In said type of bearing the blocks are subjected to the action of an initial load directed radially inwardly and they are united with each other by a sleeve element or a cage. The supporting surfaces of the blocks have convex or spherical shape and at least a portion of said surfaces contacts surfaces formed by separate members screwed into the surrounding stationary bearing part. Said separate members are radially adjustable in relation to said stationary bearing member in order to provide the initial load. Bearings of this kind are primarily intended to be used where great accuracy in the centering of the carried journal members is required. An example of such application is constituted by the spindles in grinding machines.

During operation of the bearing the lubricant films between the sliding surfaces of the blocks and the journal member, which have a wedge-shaped cross-sectional profile, may have a thickness of only a few thousands of a millimetre. In order to maintain the axis of the journal member in its position with a minimum of change under all prevailing loading and operating conditions the initial load may be adjusted so as to keep the play or clearance existing betwen the sliding surfaces positive when the bearing is standing still. However, this play may also be zero or negative, which means that the blocks may even be subjected to an initial load. On starting the rotation the blocks are raised due to the setting up of the lubricant films. When the bearing play is zero or negative this raising action is made possible by an elastic resilience in the supporting surfaces between the blocks and the members disposed in the surrounding part of the bearing.

It is known in the prior art to give one of the supporting surfaces a spherical and the other surface a plane, convex or concave shape. In all cases the contact surfaces are circular, the circular surface being formed around the theoretical point of contact. One of the main objects of the invention is to form the supporting surfaces so as to permit the resilience thereof to be kept more rigid than in known constructions and thus not to permit any but a negligible change of position of the blocks beyond the change necessary for formation of the lubricant films.

Another object of the invention is to shape the supporting surfaces so as to obtain the desired rigidity without any complicated and expensive manufacturing operations.

If the member is screwed into the stationary bearing part its position in relationship to said bearing part is changed and the initial load or the bearing play assumes another than the desired optimum values and the bearing will not obtain the desired properties. As mentioned hereinbefore the adjustment then required operates with extremely small values, for which reason even inevitable irregularities in the surfaces of the threads may influence the position of the member in the bearing part stationary in relation to said member. Even provided that the initial load is correct, it is of vital importance that the member is not subjected to any displacement, not even so small a one as that amounting for example to one or two thousands of a millimetre, due to elastic deformation of the threads when the member is mounted or subjected to the load. Any displacement of this kind would impair the desired accuracy in the centering of the journal member or spindle. With regard to this a further object of the invention is to provide a radial bearing of the sliding block type set forth which also is considerably improved in this respect in comparison to known constructions.

Further objects and advantages of the invention will become apparent from the following description considered in connection with the accompanying drawings, which form part of this specification and in which:

FIG. 1 is a longitudinal section through a radial bearing of the sliding block type constructed according to the invention; and FIG. 2 is a partial cross section taken on the line II—II of FIG. 1 through part of the bearing.

Referring to the drawings reference numeral 10 designates an inner bearing component comprising a shaft spindle provided with a cylindrical journal bearing surface 12 for a number of, such as four, bearing blocks 14 in evenly spaced relation distributed around the spindle. In the illustrated preferred embodiment the blocks are connected with a cage generally denoted by 16 and comprising a cylindrical sleeve member 18 having openings 20 for the individual blocks. The opennigs 20 are preferably circular so that they fit the cylindrical outer portion 22 of the blocks. The blocks are inserted into the openings 20 from the inside of the sleeve 18 and are provided with lateral shoes 24 with cylindrical surfaces 26, forming abutments for tight engagement with the sleeve. The cage 16 moreover has rings 28 with inclined exterior surfaces 30 which are tightly secured to the sleeve 18. Said rings consist of some suitable bearing metal and extend inwardly to form sealing clearances with the spindle 10 which clearances due to the fact that the rings 28 are carried by the blocks may be very small and nevertheless concentrically distributed around the circumference of the spindle. As a consequence the leakage through the sealing clearances is small. For a more specific description of the constructive and operative details of the bearing in such respects, reference is made to the patent specification heretofore mentioned.

Lubrication fluid, such as oil, is supplied to the space 31 confined by the cage 16 and the spindle 10 through a pipe system 32.

On the external face of the bearing blocks there are provided projections 34 forming separate members which have convex or part-spherical surfaces 36 and which are located slightly beyond the middle portion for the sliding surfaces of the blocks viewed in the direction 35 of rotation of the spindle. The blocks preferably have a flat surface 37 contacting a surface on the member 38 of the same shape. Stop members 38 and 40 (FIG. 2) may be provided on both sides of one of the blocks 14 as shown in FIG. 2 for ensuring the proper circumferential position of said block and consequently of the cage 16 and the other blocks relative to an annular stationary bearing component 42. The casing 42 in the illustrated embodiment is secured by bolts 44 to the frame 46 of a grinding machine. A cover 48 is connected by screws 50 to the casing 42, the block being guided in axial direction between a shoulder 52 on the casing and a flange 54 on the cover 48.

Inserted into the stationary bearing component 42 are plug members 56 formed with preferably conical surfaces 58 on which the projections 34 are supported. On rotation of the spindle 10, the blocks are tilted about the supporting surfaces 58 so as to cause their forward edges to rise from the bearing surface of the spindle and to form a space wedge-shaped in cross section in which the load sustaining oil film is set up. As the sleeve 18 of the cage 16 is thin it will not in any appreciable degree disturb the tilting movements of the blocks.

The projection members 34 of the blocks 14 and the conical surface 58 of the plugs 56 are in contact with each other along a surface located on either side of the circle of contact, said surface thus having an annular form. This annular contact surface is relatively large so that the elastic deformation of the material adjacent the supporting surfaces becomes small which ensures that the spindle on load variations practically does not vary its position. The contact surfaces of the projection members 34 and the plug members 56 are preferably finished to a profile depth of the remaining face irregularities which constitute a fraction only of the elastic deformation.

The blocks 14 are prestressed to an initial load by means of the plug members 56 in order to obtain a predetermined magnitude of the bearing play during operation of the bearing.

In the embodiment illustrated the outer stationary bearing component includes a plurality of annular elements 60 screwed into radial differential bores in the component, provided with threads 61, said elements being screwed tight against shoulders 62 provided by said differential bores. This measure eliminates the effect of irregularities existing in the threads and otherwise possibly resulting in a radial displacement of the annular element 60 due to elastic deformation in the threads in response to the variations of the bearing load. The element 60 has an internal bore provided with threads 63 of a relatively fine pitch corresponding to external threads 61 provided on the plug member 56. Introduced between said threads is a liquid or plastic organic cementing agent preferably of the type adapted to be cured. A synthetic resin which has proved to be suitable is ethoxylen resin.

When assemblying the bearing the plug member 56 is moved toward the projection 34 of the block by a force determined with regard to the desired initial load acting on said block. For this driving home of the plug member 56 to a predetermined radial position one may use a torque indicating driver which is understood to denote a tool on which the torque giving the desired initial load can be read off. When the cementing agent has been cured to its solid state which may be performed at normal or increased temperature and possibly by means of an additional curing agent, the plug member 56 will be anchored exactly in the desired radial position in the housing 42. The cementing agent occupies the interspaces between the threads engaging one another of the plug element and the annular member 60 so as to prevent any deformation from being produced. The annular element 60 itself is not absolutely indispensable but has the advantage that the plug member can be removed from the bearing housing for inspection or replacement. The annular element 60 may be locked by means of a pin 64 made of a relatively soft material, such as copper, so as to be cut off when the annular member is unscrewed.

The plug member 56 may have an even external lateral face, for example a cylindrical wall bearing against the internal face formed in a corresponding way of the annular member. Cementing agent is then introduced into a small clearance gap existing between said faces and during the curing of said agent the plug member is preferably loaded with a predetermined force acting in a radial direction.

While one more or less specific embodiment of the invention has been shown and described, it is to be understood that this is for purpose of illustration only and that the invention is not to be limited thereby, but its scope is to be determined by the appended claims.

What I claim is:
1. In a bearing of the class described, a rotary inner component having a journal bearing surface and a stationary outer component encircling said inner component, said stationary component having a plurality of peripherally spaced radial openings therethrough, a plurality of peripherally spaced, rotationally stationary, tiltable bearing blocks located radially between said components and peripherally confronting said openings and having inner bearing surfaces engaging said journal bearing surface, radially positioned plug members located in said openings and extending inwardly from the outer periphery of said stationary component, said plug members having conically recessed inner end surfaces facing said blocks, load transmitting elements located radially between said plug members and said blocks, said elements having spherically curved outer convex surfaces with radii constituting only a minor fraction of the width of said blocks, said spherically curved surfaces engaging the conical end surfaces of said plugs whereby to permit tilting of the blocks to form wedge-shaped load-sustaining lubricant films between the blocks and said journal surface as the latter revolves and a hardenable cementing agent for rigidly fixing the positions of said plug members radially with respect to said stationary component.

2. A bearing as defined in claim 1, in which said plug members and said stationary component are in threaded engagement and said cementiny ayent fills the clearance interstices between the threads to provide a rigid unitary connection between said plug members and said stationary component, whereby to minimize or eliminate any radial movement of said plug members relative to said stationary component due to thread deformation or the like resulting from radial load imposed on the structure.

3. The method of prestressing a bearing of the kind defined in claim 2, which comprises applying the cementing agent to the threaded parts, applying a predetermined torque to the threaded plug members before the cementing agent is hardened to thereby impose a predetermined bearing pressure of said blocks against said journal bearing surface and to maintain said predetermined bearing pressure due to the locking of the threaded plug members resulting from subsequent hardening of the cementing agent.

4. A bearing as defined in claim 2, in which said cementing agent is an organic material.

5. A bearing as defined in claim 2, in which said cementing agent is ethoxylen resin.

6. A bearing as defined in claim 1, in which the openings in said stationary component are formed by differential bores providing shoulders within the openings and in which said stationary component includes annular externally threaded elements threaded in said openings into positive abutting relation against said shoulders to rigidly locate the annular elements radially, said plug members being located in the bores of said annular elements and being radially fixed therein by said cementing agent.

7. A bearing as defined in claim 6, in which said annular elements are internally threaded and said plug members are threaded therein and fixed in position by cementing agent filling the interthread spaces of the threaded connection.

References Cited in the file of this patent

UNITED STATES PATENTS

| 2,224,652 | Kingsbury | Dec. 10, 1940 |
| 2,243,961 | Howarth | June 3, 1941 |
| 2,348,928 | Sampatocos | May 16, 1944 |

FOREIGN PATENTS

| 1,016,983 | Germany | Oct. 3, 1957 |
| 795,669 | Great Britain | May 28, 1958 |